United States Patent
Mueller et al.

(10) Patent No.: US 6,813,113 B1
(45) Date of Patent: Nov. 2, 2004

(54) DATA CARTRIDGE IMPORT/EXPORT DRAWER HAVING THREE-ELEMENT, TWO-CONFIGURATION SLIDE

(75) Inventors: Robert L. Mueller, Windsor, CO (US); Nicholas D. Thayer, Greeley, CO (US); Mark A. Smith, Holdrege, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 856 days.

(21) Appl. No.: 09/257,322

(22) Filed: Feb. 25, 1999

(51) Int. Cl.[7] ............................................. G11B 15/68
(52) U.S. Cl. ....................................................... 360/92
(58) Field of Search ..................... 360/92; 369/36–39, 369/178, 191–192; 312/334.8, 334.14, 334.15, 334.22, 334.27

(56) References Cited

U.S. PATENT DOCUMENTS

| | | | | |
|---|---|---|---|---|
| 2,277,703 A | * | 3/1942 | Kennedy | 312/334.14 |
| 2,732,706 A | | 1/1956 | Friedman | 72/38 |
| 3,190,020 A | | 6/1965 | Solari | 40/83 |

(List continued on next page.)

FOREIGN PATENT DOCUMENTS

| | | | |
|---|---|---|---|
| EP | 0506489 A2 | 9/1992 | ........... G11B/15/68 |
| EP | 0944077 A | 9/1999 | ........... G11B/17/22 |
| FR | 1.517.992 | 2/1968 | |
| WO | WO 85/02051 | 5/1985 | |

OTHER PUBLICATIONS

Patent application Ser. No. 09/045,134, filed Mar. 20, 1998, for "Multiplane Translating Cartridge Handling System" of Schmidtke et al.
Patent application Ser. No. 09/045,558, filed Mar. 20, 1998, for "Cartridge Engaging Assembly With Rack Drive Thumb Actuator System" of Coffin et al.
Patent application Ser. No. 09/179,793, filed Oct. 27, 1998, for "Mail Slot Data Cartridge Exchange System For Use With A Data Storage System" of Thayer et al.

Primary Examiner—A. J. Heinz

(57) ABSTRACT

A data cartridge exchange apparatus for a data storage system may comprise a drawer sized to receive a data cartridge and a first guide rail having a first configuration mounted to the drawer. A guide rail having a second configuration is sized to engage the first guide rail having the first configuration mounted to the drawer. A second guide rail having the first configuration is mounted to the data storage system and is sized to engage the guide rail having the second configuration so that the drawer can be moved between a retracted position and an extended position.

17 Claims, 11 Drawing Sheets

U.S. PATENT DOCUMENTS

| | | | |
|---|---|---|---|
| 3,363,383 A | | 1/1968 | Barge .......................... 52/471 |
| 4,072,375 A | * | 2/1978 | Boone ........................ 312/338 |
| 4,759,341 A | * | 7/1988 | McFarland ............. 312/334.15 |
| 4,837,647 A | | 6/1989 | Nonaka et al. ............... 360/92 |
| 4,907,706 A | | 3/1990 | Henderson ................... 211/46 |
| 4,982,851 A | | 1/1991 | Konstant .................... 211/151 |
| 4,998,232 A | | 3/1991 | Methlie et al. ............... 369/36 |
| 5,001,582 A | | 3/1991 | Numasaki ................ 360/98.06 |
| 5,010,536 A | | 4/1991 | Wanger et al. ................ 369/36 |
| 5,014,255 A | | 5/1991 | Wanger et al. ................ 369/36 |
| 5,036,503 A | | 7/1991 | Tomita ........................ 369/36 |
| 5,043,962 A | | 8/1991 | Wanger et al. ................ 369/36 |
| 5,060,211 A | | 10/1991 | Blanding .................... 369/36 |
| 5,101,387 A | | 3/1992 | Wanger et al. ................ 369/36 |
| 5,178,288 A | | 1/1993 | Werner et al. .............. 211/151 |
| 5,207,336 A | | 5/1993 | Tyler .......................... 211/162 |
| 5,224,610 A | | 7/1993 | Veazey ........................ 211/87 |
| 5,267,658 A | | 12/1993 | Schwenk et al. .............. 211/26 |
| 5,348,778 A | | 9/1994 | Knipp et al. ................ 428/35.8 |
| 5,417,020 A | | 5/1995 | Dobija ........................ 52/235 |
| 5,485,934 A | | 1/1996 | Holztrager .................. 211/194 |
| 5,501,047 A | | 3/1996 | Delaunay et al. ............. 52/273 |
| 5,544,146 A | | 8/1996 | Luffel et al. ................. 369/178 |
| 5,579,924 A | | 12/1996 | Sands et al. ................... 211/26 |
| 5,592,794 A | | 1/1997 | Tundaun ................... 52/220.7 |
| 5,596,556 A | | 1/1997 | Luffel et al. .................. 369/36 |
| 5,626,405 A | * | 5/1997 | Banks ..................... 312/334.8 |
| 5,638,349 A | | 6/1997 | Rugg et al. ................... 369/36 |
| 5,644,445 A | * | 7/1997 | Ishikawa ..................... 360/92 |
| 5,682,096 A | | 10/1997 | Christie, Jr. et al. ...... 324/207.2 |
| 5,798,997 A | | 8/1998 | Ware et al. ................. 369/75.2 |
| 5,951,132 A | * | 9/1999 | Cirocco ................. 312/334.46 |
| 6,038,099 A | * | 3/2000 | Heinze ........................ 360/92 |
| 6,050,628 A | * | 4/2000 | Allison ..................... 312/334.8 |

\* cited by examiner

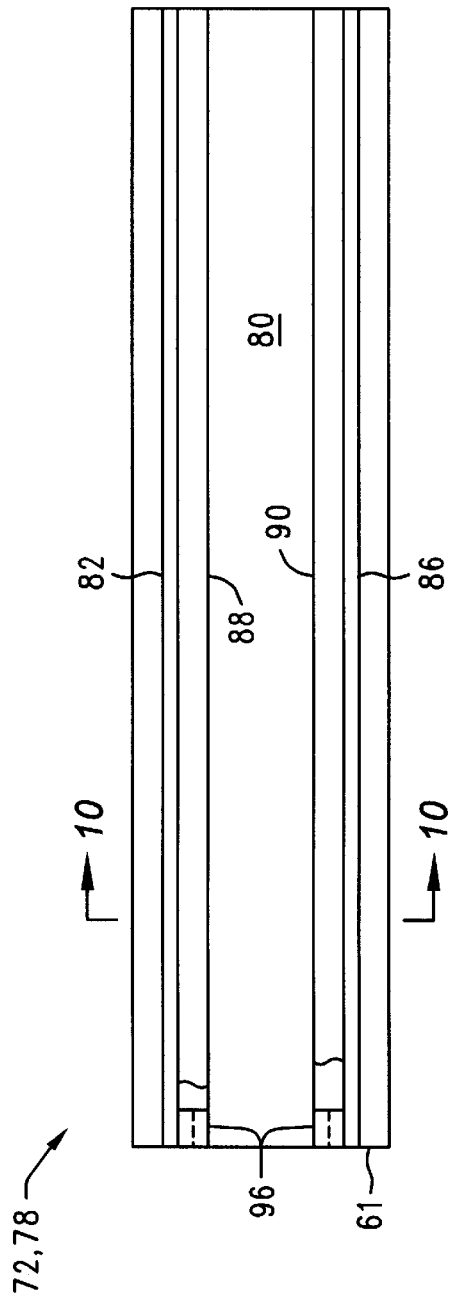
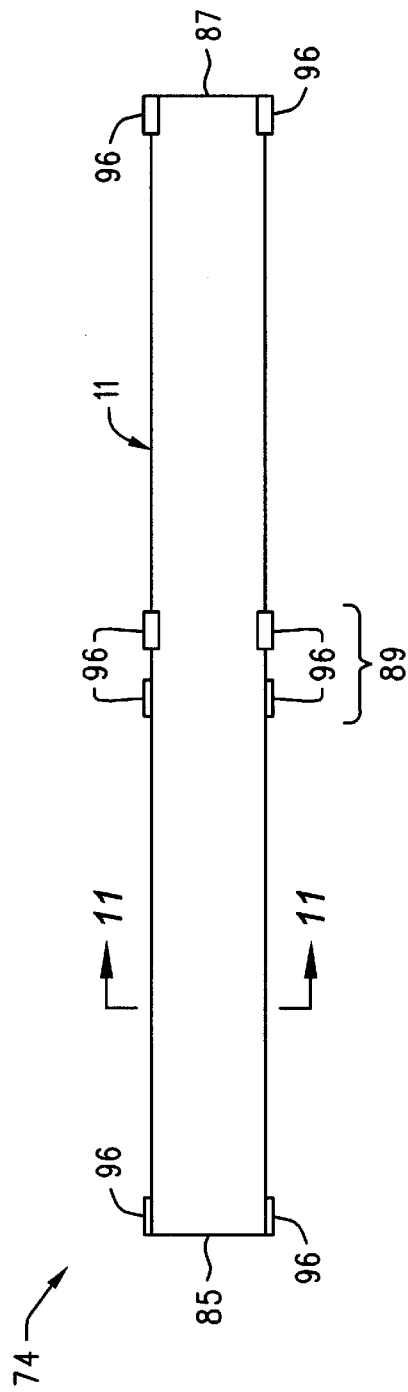

DATA CARTRIDGE IMPORT/EXPORT DRAWER HAVING THREE-ELEMENT, TWO-CONFIGURATION SLIDE

FIELD OF INVENTION

This invention relates generally to data cartridge exchange systems for mass data storage systems and more specifically to a data cartridge exchange apparatus having an improved mounting system.

BACKGROUND

Many different types of data storage systems exist and are being used to store data cartridges at known locations and to retrieve desired data cartridges so that data may be written to or read from the data cartridges. Such data storage systems are often referred to as "jukebox" data storage systems, particulary if they can accommodate a large number of individual data cartridges.

A typical jukebox data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are commonly arranged so that they form one or more vertical stacks, although other configurations are possible. The cartridge read/write device may be located at any convenient location within the data storage system.

The data storage system may also be provided with a cartridge handling system for transporting the data cartridges between the various cartridge receiving devices, e.g., between the cartridge storage racks and the cartridge read/write devices. A typical cartridge handling system may include a cartridge engaging assembly or "picker" for engaging the various data cartridges contained in the cartridge receiving devices, as well as a positioning device for moving the cartridge engaging assembly among the various cartridge receiving devices.

Jukebox data storage systems of the type described above are usually connected to a host computer system (not shown) which may access or store data on the data cartridges. For example, if the host computer system issues a request for data contained on a particular data cartridge, a control system associated with the data storage system actuates the positioning system to move the cartridge engaging assembly or picker along the cartridge storage racks until the cartridge engaging assembly is positioned adjacent the desired data cartridge. The cartridge engaging assembly may then remove the data cartridge from the cartridge storage rack and carry it to the cartridge read/write device. Once properly positioned adjacent the cartridge read/write device, the cartridge engaging assembly may insert the selected data cartridge into the cartridge read/write device so that the host computer may thereafter read data from or write data to the data cartridge. After the read/write operation is complete, the cartridge engaging assembly may remove the data cartridge from the cartridge read/write device and return it to the appropriate location in the cartridge storage rack.

It is often necessary or desirable for a system operator to periodically access one or more of the data cartridges contained within such a jukebox data storage system. For example, it may be necessary for the system operator to remove certain of the data cartridges from time to time if they become filled with data that is to be archived at another location. The system operator may then replace the filled data cartridges with blank data cartridges. In another situation, the system operator may desire to remove one or more of the data cartridges and replace it or them with a substitute data cartridge or cartridges containing different data.

In order to accommodate the foregoing needs, many jukebox data storage systems are provided with an access panel to allow the system operator to access to the data cartridges stored within the data storage system. While such an arrangement is usually effective from a functional standpoint, it is usually difficult and cumbersome to implement in practice. For example, since the access panel needs to be removed in order to access the data cartridges, the data storage system must be temporarily shut-down or suspended in order to prevent the cartridge handling system from interfering with the system operator's access to the cartridges and to prevent injury to the system operator should the cartridge engaging assembly move while the system operator's hand is inside the data storage system. Another difficulty is that it is often difficult for the system operator to locate the particular data cartridges that are to be replaced. Still another disadvantage is that once the access panel has been replaced, it is necessary for the data storage system to re-inventory all the data storage cartridges contained therein. Such re-inventory processes are time consuming and difficult to justify, particularly if only one cartridge has been replaced. Nevertheless, the data storage system must re-inventory the data cartridges before the data storage system can be returned to service.

Partly in an effort to solve some of the problems associated with the foregoing type of data cartridge exchange system, a data storage system has been developed that includes an extendable drawer that can be pulled open to allow a system operator to access the data cartridges stored in the data storage system. An example of such a system is shown and described in U.S. patent application Ser. No. 09/179,793 filed on Oct. 27, 1998 and entitled "Mail Slot Data Cartridge Exchange System For Use With A Data Storage System," which is incorporated herein by reference for all that it discloses. Such an extendable drawer is useful in that it allows a system operator to access a data cartridge without the need to remove a separate access panel. Consequently, this drawer type of data cartridge exchange system eliminates the need to temporarily suspend the operation of the data storage system while the system operator is accessing the data cartridges. Unfortunately, the drawer type of data cartridge exchange system is not without its disadvantages. For example, the mechanism that is used to slidably mount the extendable drawer to the chassis of the data storage system is not particularly robust, and may be damaged if the system operator is careless and leans on the drawer while the same is in the extended position. While the drawer slide mechanism can be made more robust, most robust designs usually add to the cost of the system. Moreover, more robust drawer slide systems may also be difficult to assemble, perhaps complicating the assembly of the overall data storage system in which they are to be used.

SUMMARY OF THE INVENTION

A data cartridge exchange apparatus for a data storage system may comprise a drawer sized to receive a data cartridge and a first guide rail having a first configuration mounted to the drawer. A guide rail having a second configuration is sized to engage the first guide rail having the first configuration mounted to the drawer. A second guide rail having the first configuration is mounted to the data storage system and is sized to engage the guide rail having the second configuration so that the drawer can be moved between a retracted position and an extended position.

BRIEF DESCRIPTION OF THE DRAWING

Illustrative and presently preferred embodiments of the invention are shown in the accompanying drawing in which:

FIG. 8 is a plan view of the guide rail having the first configuration with portions of the bearing tracks broken away to show the U-shaped bearing members mounted thereon;

FIG. 9 is a plan view of the guide rail having the second configuration showing the relative positions of the U-shaped bearings mounted thereon;

DETAILED DESCRIPTION OF THE INVENTION

Figure 1:
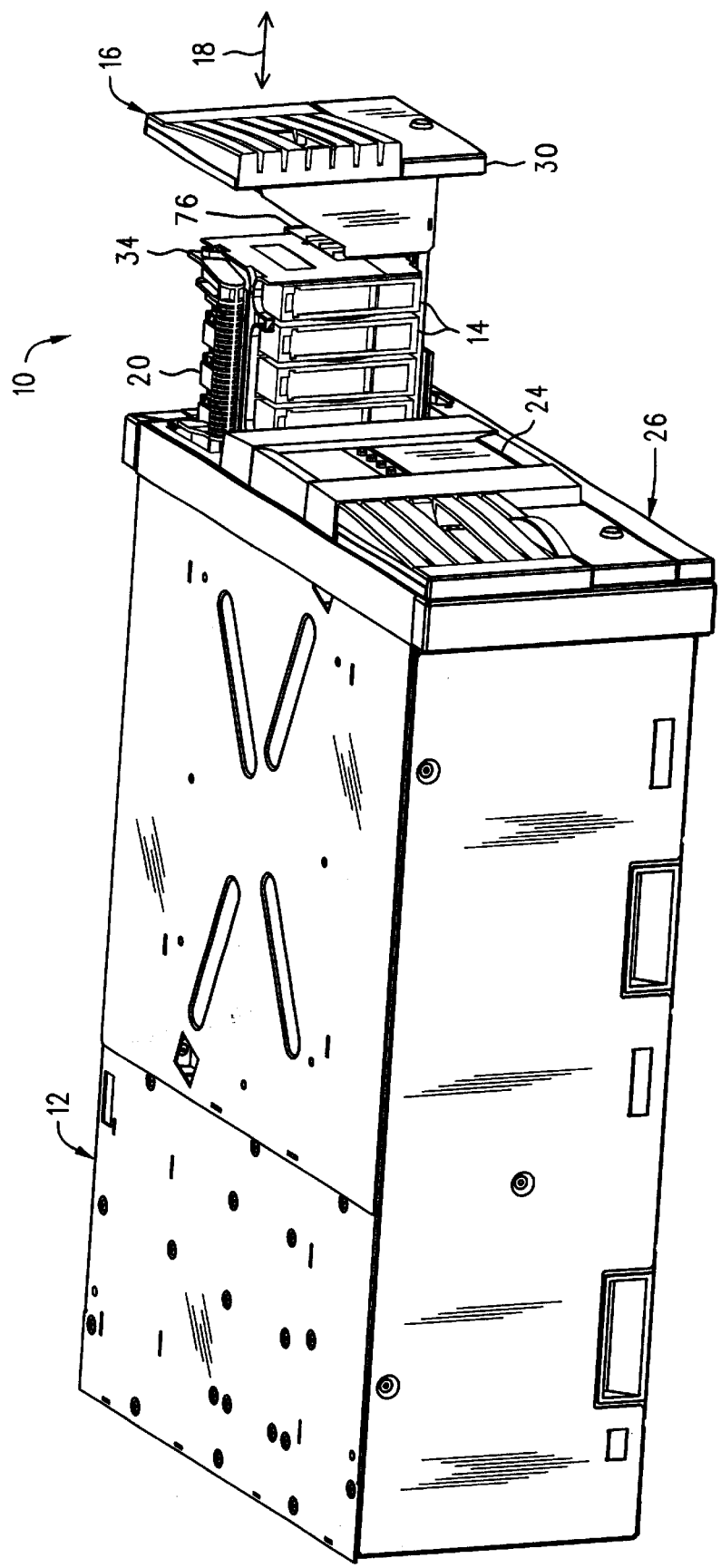
FIG. 1 is a perspective view of a jukebox data storage system having a data cartridge exchange apparatus according to the present invention.

A data cartridge exchange apparatus 10 according to one embodiment of the present invention is shown in FIG. 1 as it could be used in conjunction with a jukebox data storage system 12 of the type used to hold one or more data cartridges 14. The data cartridge exchange apparatus 10 allows at least one data cartridge 14 to be accessed by a system operator (not shown) during the operation of the jukebox data storage system 12. For example, the system operator may use the data cartridge exchange apparatus 10 to withdraw a certain data cartridge 14 and replace it with a substitute data cartridge (not shown). The data cartridge exchange apparatus 10 thereby provides a convenient way to deposit and withdraw selected data cartridges to and from the jukebox data storage system 12.

Figure 2:
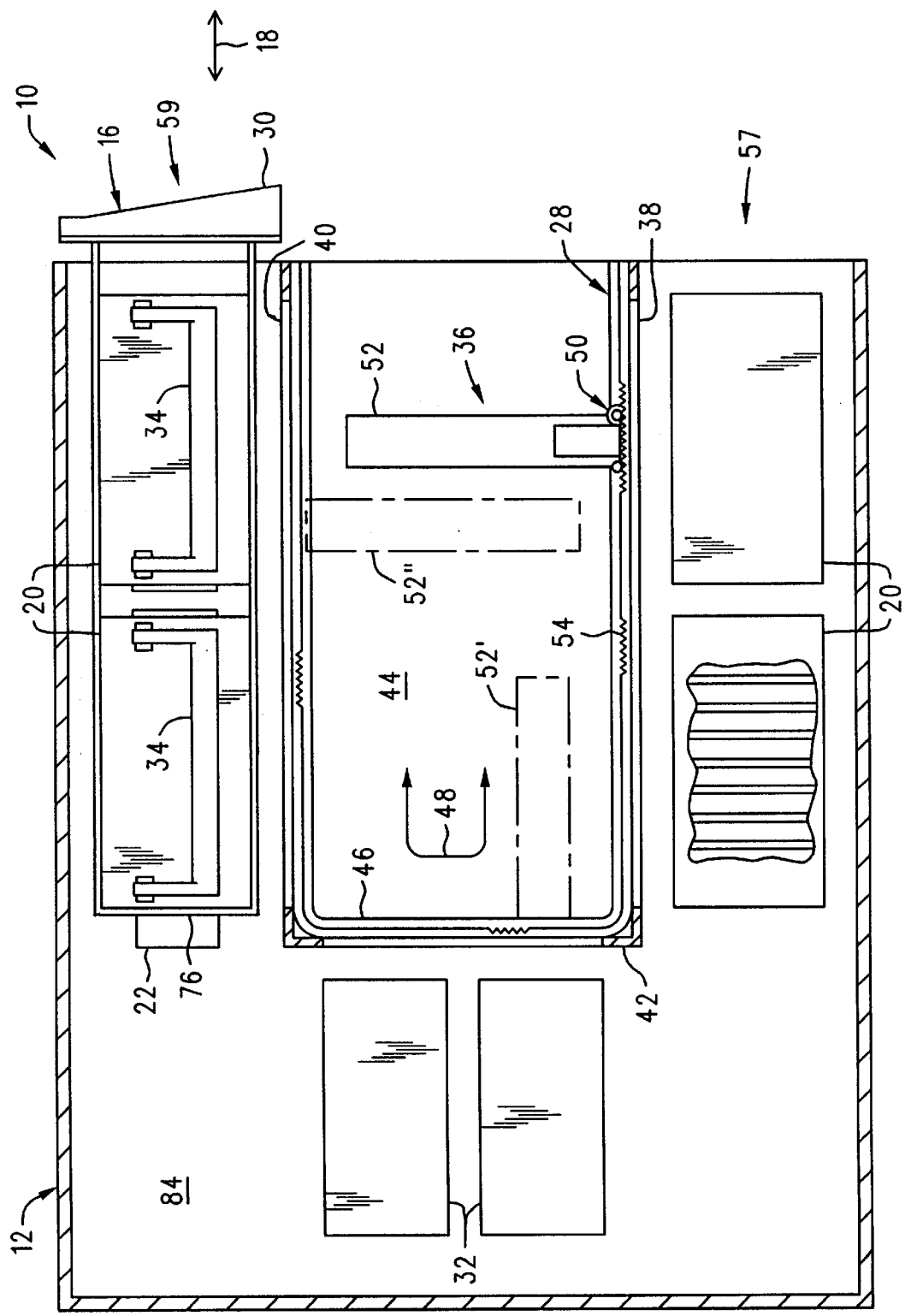
FIG. 2 is a plan view of the data storage system shown in FIG. 1 illustrating the internal arrangement of the cartridge storage locations and cartridge handling system used to access the data cartridges.

With reference now to FIGS. 1 and 2, the data cartridge exchange apparatus 10 utilized in one preferred embodiment of the present invention may comprise a drawer 16 mounted to the data storage system 12 so that the drawer 16 may be moved between a retracted or closed position (shown in FIG. 2) and an extended or open position (shown in FIG. 1), i.e., generally in the directions indicated by arrows 18. The drawer 16 may be configured to receive one or more data cartridges 14 which, in one preferred embodiment, may be contained within one or more cartridge magazines 20. That is, the drawer 16 may be configured to receive one or more cartridge magazines 20, with each cartridge magazine 20 being configured to receive one or more data cartridges 14. Alternatively, and as will be described in greater detail below, the drawer 16 may be configured to directly accept one or more data cartridges 14 without the need for a separate cartridge magazine 20.

Figure 3:
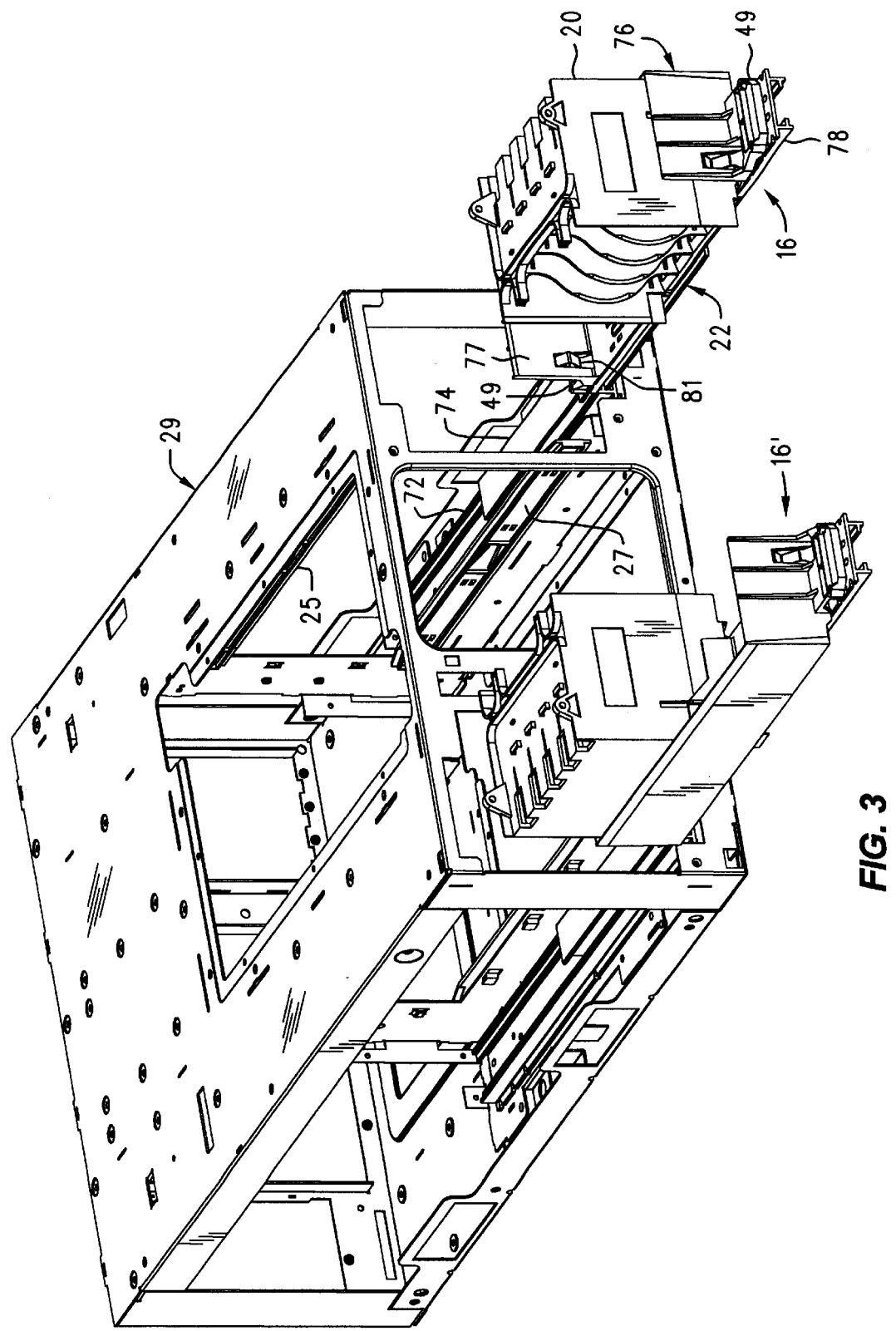
FIG. 3 is a perspective of another embodiment of a data storage system having two data cartridge exchange drawers.

Before proceeding with the description, it should be noted that the jukebox data storage system 12 may be provided with any convenient number of drawers 16. For example, in the embodiment shown in FIGS. 1 and 2, the jukebox data storage system 12 is provided with a single drawer 16. Alternatively, the jukebox data storage system 12 could be provided with a second drawer 16', as best seen in FIG. 3. However, since each drawer assembly (e.g., 16, 16') is essentially identical, knowledge of the number of drawers that may be provided to a particular jukebox data storage system 12 is not required to understand and practice the present invention. Consequently, the remainder of the description will be directed to a jukebox data storage system 12 having only a single drawer 16.

The drawer 16 may be mounted to the data storage system 12 by a mounting system 22. Referring now to FIGS. 7–12, the mounting system 22 may comprise three guide rails 72, 74, and 78 that are mounted in sliding engagement with one another. The sliding engagement of the three guide rails 72, 74, and 78 allows the drawer 16 to be moved between the extended (i.e., open) and retracted (i.e., closed) positions in the manner already described. In one preferred embodiment, each of the three guide rails 72, 74, and 78 comprises one of two configurations: A first configuration (best seen in FIGS. 8 and 10) and a second configuration (best seen in FIGS. 9 and 11). More specifically, guide rails 72 and 78 may comprise the first configuration, whereas guide rail 74 may comprise the second configuration. Accordingly, only two guide rail configurations are required even though the mounting system 22 utilizes three separate guide rails 72, 74, and 78.

Figure 10:
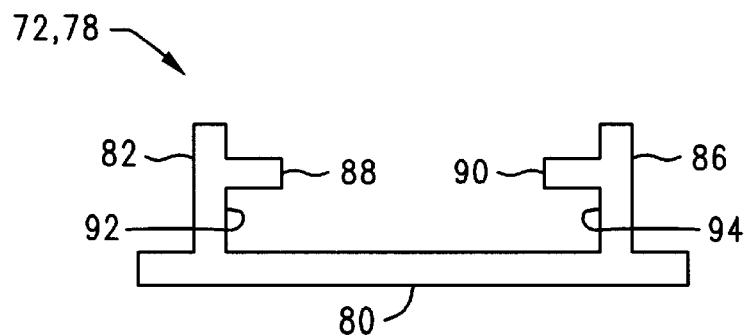
FIG. 10 is a cross-section view in elevation of the guide rail having the first configuration taken along the line 10—10 of FIG. 8.

Referring now primarily to FIGS. 8 and 10, the guide rail having the first configuration (e.g., guide rails 72 and 78) may comprise an elongate member having a back portion 80 from which extend a pair of flanges 82 and 86. A first bearing track 88 extends generally outwardly from the flange 82, whereas a second bearing track 90 extends generally outwardly from the flange 86. The two bearing tracks 88 and 90 are substantially parallel to the back portion 80 and, together with flanges 82 and 86, define respective first and second channels 92 and 94. See FIG. 10. A pair of U-shaped bearing members 96 may be provided within the channels 92 and 94 at substantially the proximal end 61 of the guide rail, as best seen in FIG. 8.

Figure 11:
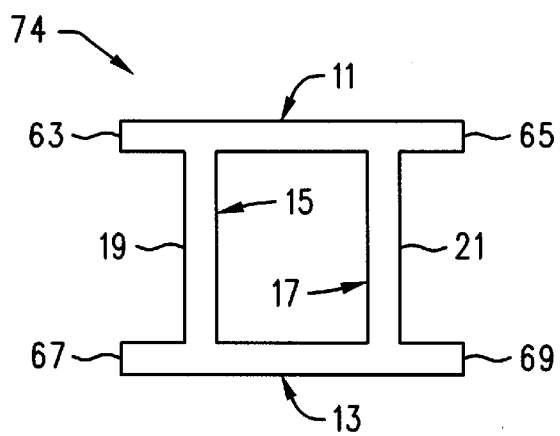
FIG. 11 is a cross-section view in elevation of the guide rail having the second configuration taken along the line 11—11 of FIG. 9.
Figure 12:
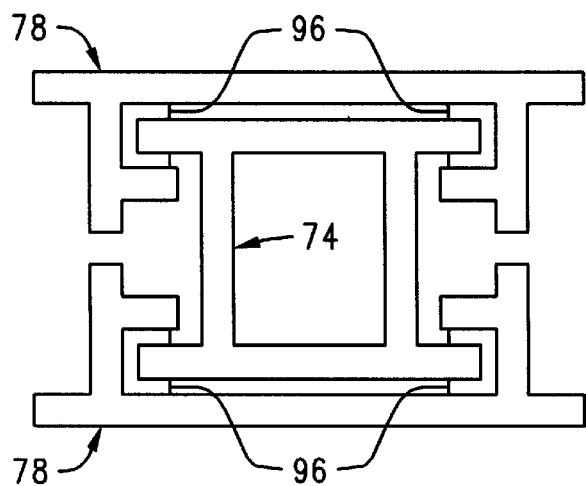
FIG. 12 is an end view in elevation of the guide rails comprising the mounting system.

The guide rail having the second configuration (e.g., guide rail 74) is best seen in FIGS. 11 and 12 and may comprise an elongate member having a cross-section generally in the form of a Roman numeral II. Specifically, the guide rail 74 having the second configuration may comprise a pair of elongate bearing guide members 11 and 13 that are held in substantially parallel, spaced-apart relation by a pair of flange members 15 and 17. The guide members 11 and 13, together with first and second flanges 15 and 17, define respective first and second channels 19 and 21. The bearing guide members 11 and 13 of guide rail 74 having the second configuration also may be provided with a plurality of U-shaped bearing members 96 that are located substantially in the positions shown in FIG. 9.

Figure 7:
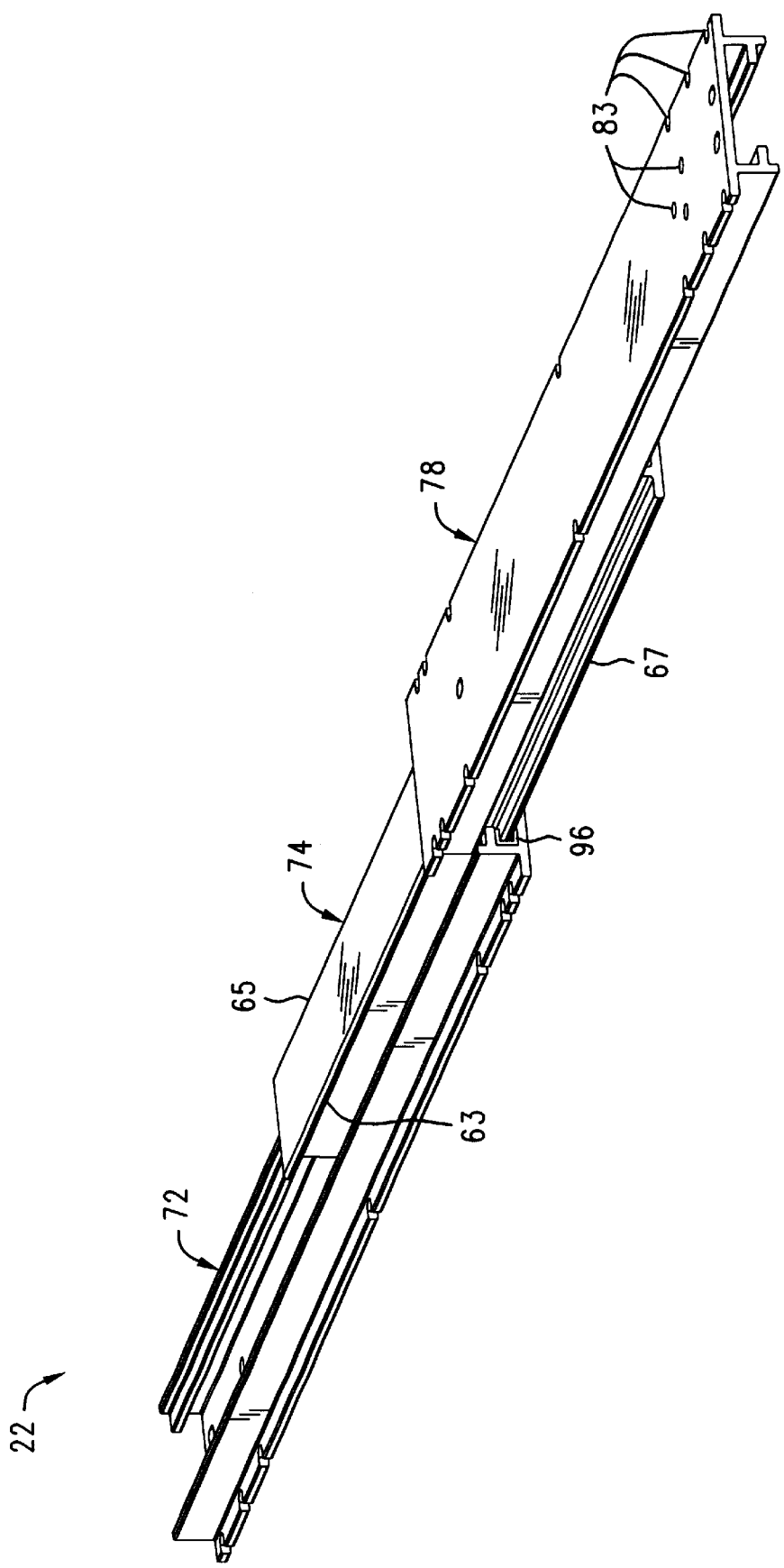
FIG. 7 is a perspective view of the mounting system that may be used to slidably mount the drawer to the data storage system.

The three guide rails 72, 74, and 78 may be slidably engaged with one another in the manner best seen in FIGS. 7 and 12. That is, the channels 92 and 94 of the guide rails having the first configuration (e.g., guide rails 72 and 78) receive the U-shaped bearing members 96 mounted to the bearing guide members 11 and 13 of the guide rail having the second configuration (e.g., guide rail 74). Similarly, the U-shaped bearings 96 located in the channels 92 and 94 of the guide rails 72 and 78 having the first configuration engage the bearing guide members 11 and 13 of the guide rail 74 having the second configuration.

The U-shaped bearings 96 affixed to the various guide rails are located at positions such that the U-shaped bearings 96 located in the channels 92 and 94 of the guide rails 72 and 78 abut the U-shaped bearings 96 located at the center region 89 of guide rail 74 when the rails 72, 74, and 78 are in the fully extended position (FIG. 7). This abutment of the U-shaped bearings 96 prevents the user from inadvertently pulling the drawer 16 beyond the extended position and possibly separating the various guide rails 72, 74, and 78.

Figure 6:
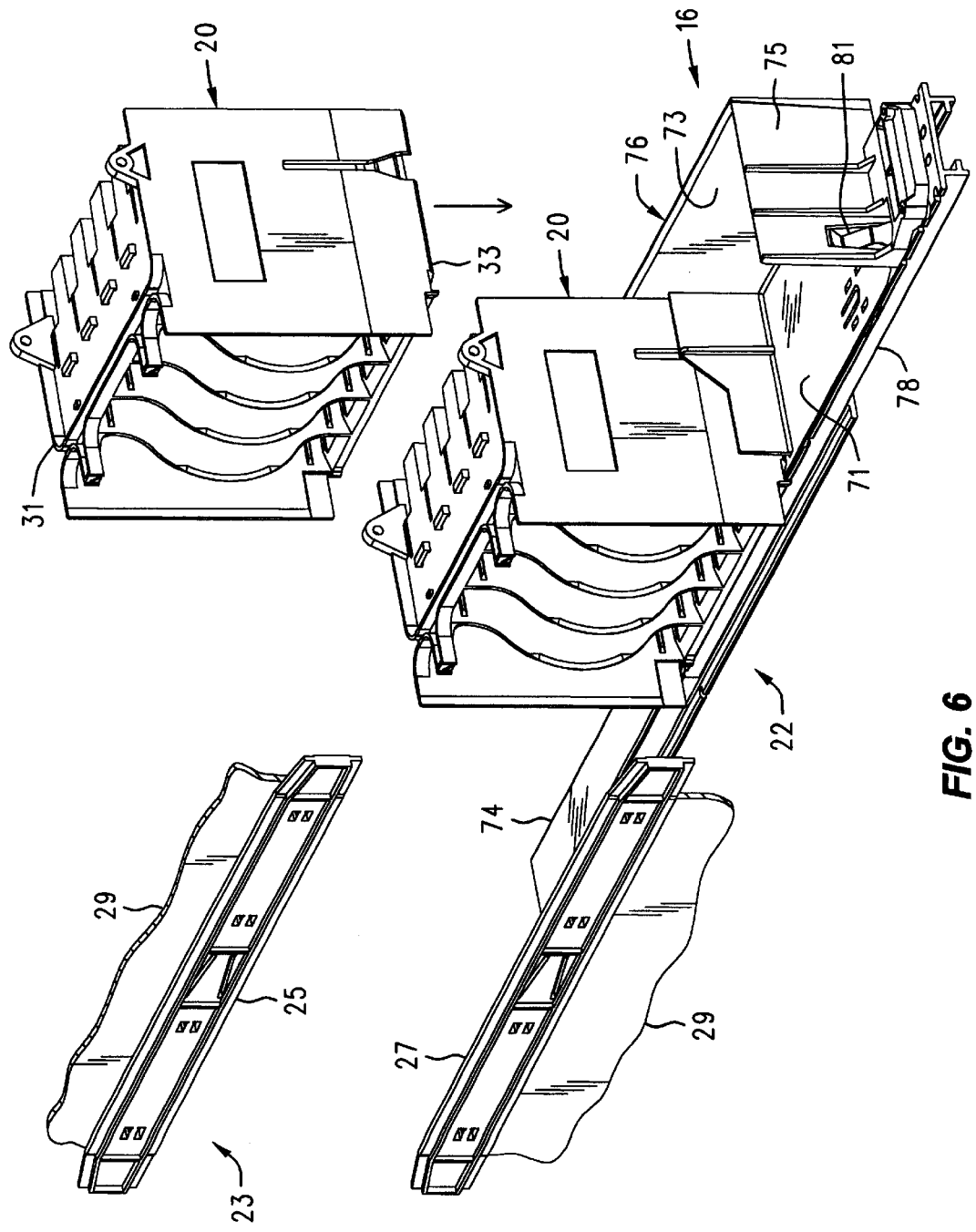
FIG. 6 is an exploded perspective view of the drawer, drawer mounting system, and cartridge magazine reference rails shown in FIG. 3.
Figure 13:
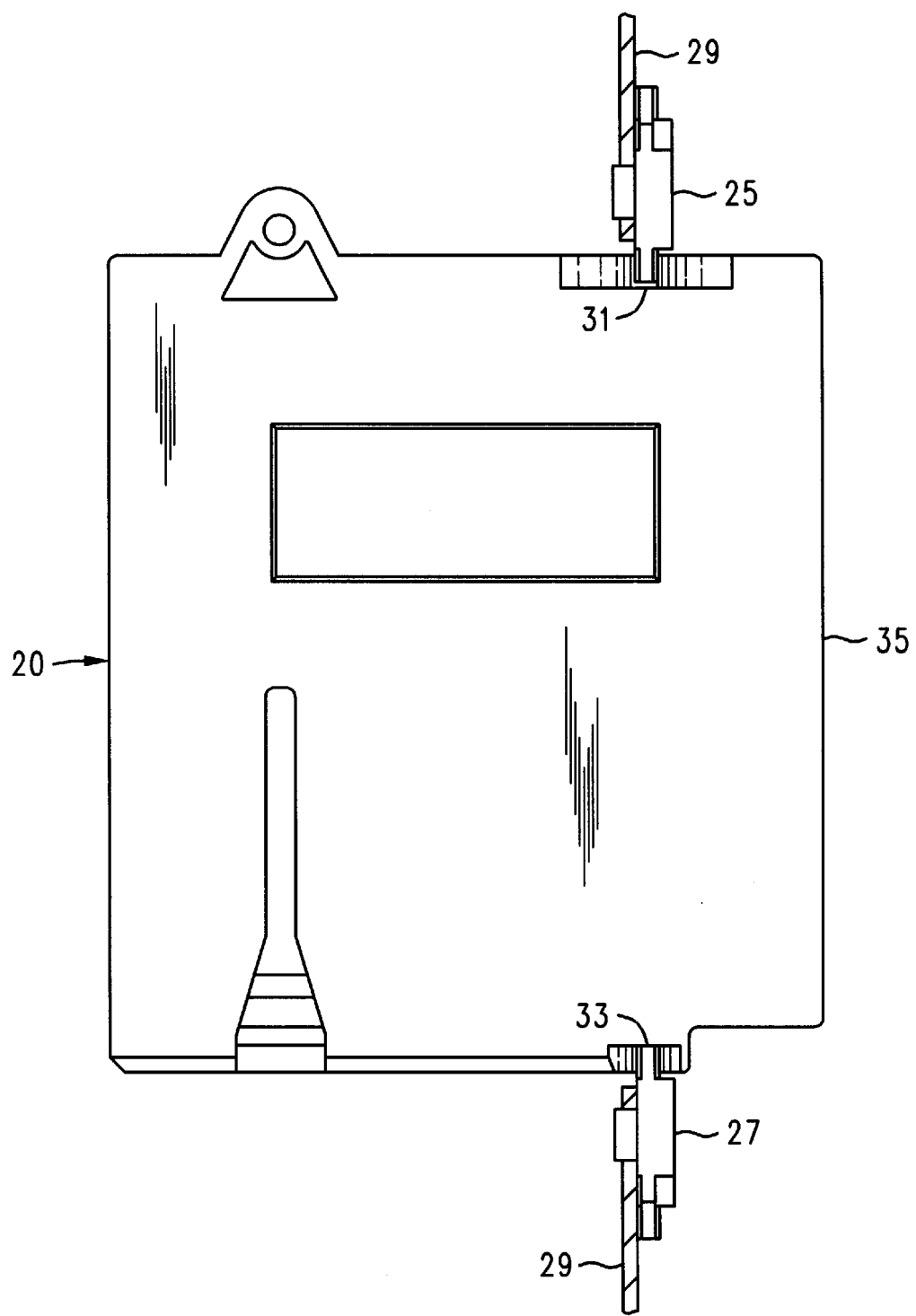
FIG. 13 is a side view in elevation showing the engagement of the cartridge magazine and reference rails

The data cartridge exchange apparatus 10 may also be provided with a cartridge magazine alignment apparatus 23 to more positively locate the magazines 20 with respect to the chassis 29 of the jukebox data storage system 12 when the drawer 16 is in the retracted position. Referring now to FIGS. 6 and 13, the cartridge magazine alignment apparatus 23 utilized in one preferred embodiment of the invention may comprise a pair of elongate reference rails 25 and 27 that are mounted directly to the chassis 29 of the jukebox data storage system 12. See also FIG. 3. Each cartridge magazine 20 is provided with first and second elongate slots 31 and 33 therein which are sized to slidably engage the respective elongate reference rails 25 and 27 when the drawer 16 is moved to the retracted (i.e., closed) position. The engagement of the elongate reference rails 25 and 27 with the respective slots 31 and 33 in the magazines 20 slightly lifts the magazines 20 from the drawer 16 and holds each magazine 20 in a registration position 35, as best seen in FIG. 13. As will be explained in greater detail below, the registration position 35 is independent of the position of the drawer 16 when the drawer 16 is fully closed. That is, when the drawer 16 is fully closed or retracted, the positions of the magazines 20 are determined by the cartridge magazine alignment apparatus 23 and not by the drawer 16.

It is generally preferred, but not required, that the data cartridge exchange apparatus 10 also be provided with a drawer lock apparatus 37 (FIG. 14) to lock the drawer 16 in the fully retracted or closed position. Briefly, the drawer lock apparatus 37 may comprise a lock actuator 39 for moving a plunger or lock bolt 41 between a locked position 43 and an unlocked position 45. The lock bolt 41 is sized to engage at least one of the two apertures 47 provided in a lock plate 49 mounted on drawer 16. See FIG. 15. A limit switch 51 mounted to the chassis 29 of data storage system 12 detects when the drawer 16 is moved to the fully retracted position.

Limit switch 51 may be connected to a lock control system 53 which may be used to operate the lock actuator 39 in the manner that will be described in greater detail below to lock the drawer 16 in the fully closed or retracted position.

The data cartridge exchange apparatus 10 may be operated as follows to allow the system operator (not shown) to access the various data cartridges 14 contained within the data storage system 12. Consider, for example, a situation wherein the data storage system 12 has been provided with a plurality of data cartridges 14. During normal operation, the drawer 16 may remain in the fully closed or retracted position shown in FIG. 2, thereby allowing the cartridge handling system 28 (FIGS. 2 and 4) inside the data storage system 12 to access all of the data cartridges 14 contained therein. If the need then arises for the system operator to access one or more of the data cartridges 14, such as, for example, to remove one or more of the data cartridges 14 and replace it or them with a substitute data cartridge or data cartridges (not shown), the system operator may pull on the front panel 30 of the drawer 16, thereby moving the drawer 16 to the extended position (FIG. 1). If the data cartridge exchange apparatus 10 is provided with a drawer lock apparatus 37, the lock control system 53 would first have to be instructed to unlock the drawer 16. The lock control system 53 could be so instructed by the jukebox control system (not shown), or by the system operator via control panel 24.

In any event, once the drawer 16 has been opened or extended, the system operator may access the exposed data cartridges 14 for the exchange, removal, or replacement of the same. While the drawer 16 is in the extended position, the data storage system 12 may remain operable and the cartridge handling system 28 may continue to access the data storage cartridges 14 stored in a "fixed" cartridge storage array 57 (FIG. 2) (i.e., those cartridges 14 not stored in drawer 16). However, the cartridge handling system 28 will not access the data cartridges 14 contained in the opened drawer 16.

When the system operator no longer needs access to the exposed data cartridges 14, he or she may push on the front panel 30 of drawer 16, thereby returning the drawer 16 to the retracted position. As the drawer 16 is moved to the retracted position, the elongate reference rails 25 and 27 engage the respective slots 31 and 33 on the cartridge magazines 20. When fully engaged with the slots 31 and 33, the reference rails 25 and 27 slightly lift the magazines 20 from the drawer 16 and hold each magazine 20 in the registration position 35 (FIG. 13), thereby ensuring that the cartridge handling system 28 will be able to accurately locate the desired data cartridge 14.

After the drawer 16 has been fully closed, the lock control system 53 (FIG. 14) may operate the drawer lock apparatus 37 to lock the drawer 16 in the fully closed or retracted position. Thereafter, the data storage system 12 may "re-inventory" the data cartridges 14 stored within the data storage system 12. In the present example, the data storage system 12 need only re-inventory those data cartridges 14 contained in the drawer 16 since those were the only data cartridges 14 that could have been exchanged, removed, or replaced by the system operator.

It should be noted that any of the data cartridges 14 contained within the data storage system 12 may be accessed via the data cartridge exchange apparatus 10. For example, data cartridges 14 stored in the magazines 20 that are mounted in the "fixed" cartridge storage array 57 (FIG. 2) located opposite the drawer 16 also may be accessed by instructing the cartridge handling system 28 to move the selected data cartridges 14 from the "fixed" cartridge storage array 57 (i.e., those cartridge magazines 20 that are not mounted on the drawer 16) to the "moveable" cartridge storage array 59 (i.e., those cartridge magazines 20 contained in the drawer 16. After the selected data cartridges 14 have been transferred from the fixed cartridge storage array 57 to the moveable cartridge storage array 59, the system operator may then access the recently transferred data cartridges 14 in the manner already described by simply opening the drawer 16.

Alternatively, if the jukebox data storage system 12 is provided with a second drawer 16' as shown in FIG. 3, the operator may directly access the cartridges contained in the second drawer 16' by simply opening the second drawer 16' in the manner already described for the first drawer 16.

A significant advantage associated with the data cartridge exchange apparatus 10 is that it provides easy and convenient access to one or more data cartridges 14 contained within the jukebox data storage system 12, but without the need to remove a panel or panels on the data storage system to manually access the cartridges stored therein. The data cartridge exchange apparatus 10 also allows one or more data cartridges 14 to be accessed by the system operator without the need to suspend the operation of the data storage system during those times in which the data cartridges are being accessed. The present invention also dispenses with the need to provide a separate cartridge transport mechanism to present the desired data cartridge to the system operator. Another advantage of the present invention is that it allows for more than one data cartridge 14 to be accessed at one time.

Still other advantages are associated with the drawer mounting system 22. For example, while the drawer mounting system 22 utilizes three guide rails, it requires only two different guide rail configurations, thereby simplifying manufacture. The various guide rails comprising the mounting system 22 provide a relatively robust structure while at the same time being relatively easy and inexpensive to fabricate and assemble. The robust structure provided by the guide rails also reduces the likelihood that the drawer or mounting system 22 will become damaged if the system operator bumps or leans on the drawer 16 while it is open. Also, the abutting engagement of the bearing members 96 that occurs when the guide rails of the mounting system 22 are fully extended prevents the system operator from inadvertently moving the drawer beyond the fully extended position and possibly separating the guide rails.

Still yet other advantages are associated with the cartridge magazine alignment apparatus 23. For example, the more accurate positioning of the magazines 20 provided by the cartridge magazine alignment apparatus 23 substantially improves the likelihood that the cartridge picker 36 will be capable of engaging the selected data cartridge 14 without the danger of a mis-feed. The alignment apparatus also dispenses with the need to provide a high precision drawer mounting system. That is, since the magazines 20 are not held in position by the drawer 16, the mounting system 22 for the drawer 16 need not be designed to return the drawer 16 and magazines 20 to their exact locations each time the drawer 16 is closed.

Having briefly described the data cartridge exchange apparatus 10, as well as some of its more significant features and advantages, the various embodiments of the data cartridge exchange apparatus according to the present invention will now be described in detail. However, before proceeding with the description, it should be noted that the data cartridge exchange apparatus 10 according to the present invention may be utilized in any of a wide range of data storage systems now known or that may be developed in the future for storing and accessing one or more data cartridges contained therein. Accordingly, the present invention should not be regarded as limited to the particular jukebox data storage system 12 shown and described herein. It should also be noted that while the data cartridge exchange apparatus 10 is shown and described herein as it could be used to store and retrieve at least one DLT (digital linear tape) data cartridge 14 having a standard size and configuration, it is not limited to any particular type or style of data cartridge. Indeed, the data cartridge exchange apparatus 10 according to the present invention could be used with any type of data storage device comprising any type of data storage medium (e.g., magnetic disk or tape, optical disk, etc.). Consequently, the present invention should not be regarded as limited to use with the DLT type of data cartridge 14 shown and described herein.

With the foregoing considerations in mind, one embodiment of a data cartridge exchange apparatus 10 is shown in FIG. 1 as it may be used in a jukebox data storage system 12 of the type used to store and access large amounts of data contained on one or more data cartridges 14. The jukebox data storage system 12 may be provided with a cartridge handling system 28 (FIG. 2) to transfer data cartridges 14 between one or more cartridge receiving devices, such as one or more cartridge storage magazines 20 and one or more cartridge read/write devices 32. The various cartridge receiving devices (e.g., the cartridge storage magazines 20 and the cartridge read/write devices 32) may be positioned at various locations within the data storage system 12 so that they define a generally U-shaped configuration, as best seen in FIG. 2, although other configurations are possible.

By way of example, the jukebox data storage system 12 utilized in one preferred embodiment may comprise a data storage system of the type shown and described in U.S. patent application Ser. No. 09/045,134, entitled "Multi-Plane Translating Cartridge Handling System" filed on Mar. 20, 1998, now U.S. Pat. No. 6,025,972, issued Feb. 15, 2000, and which is incorporated herein by reference for all that it discloses. Alternatively, the data cartridge exchange apparatus 10 may be utilized in a data storage system of the type shown and described in U.S. Pat. No. 5,596,556, which is also incorporated herein by reference for all that it discloses. The cartridge handling system 28 utilized in the data storage system 12 may be of the type shown and described in U.S. Pat. No. 6,025,972, identified above, although other types of cartridge handling systems that are now known or that may be developed in the future and could also be used.

Figure 4:
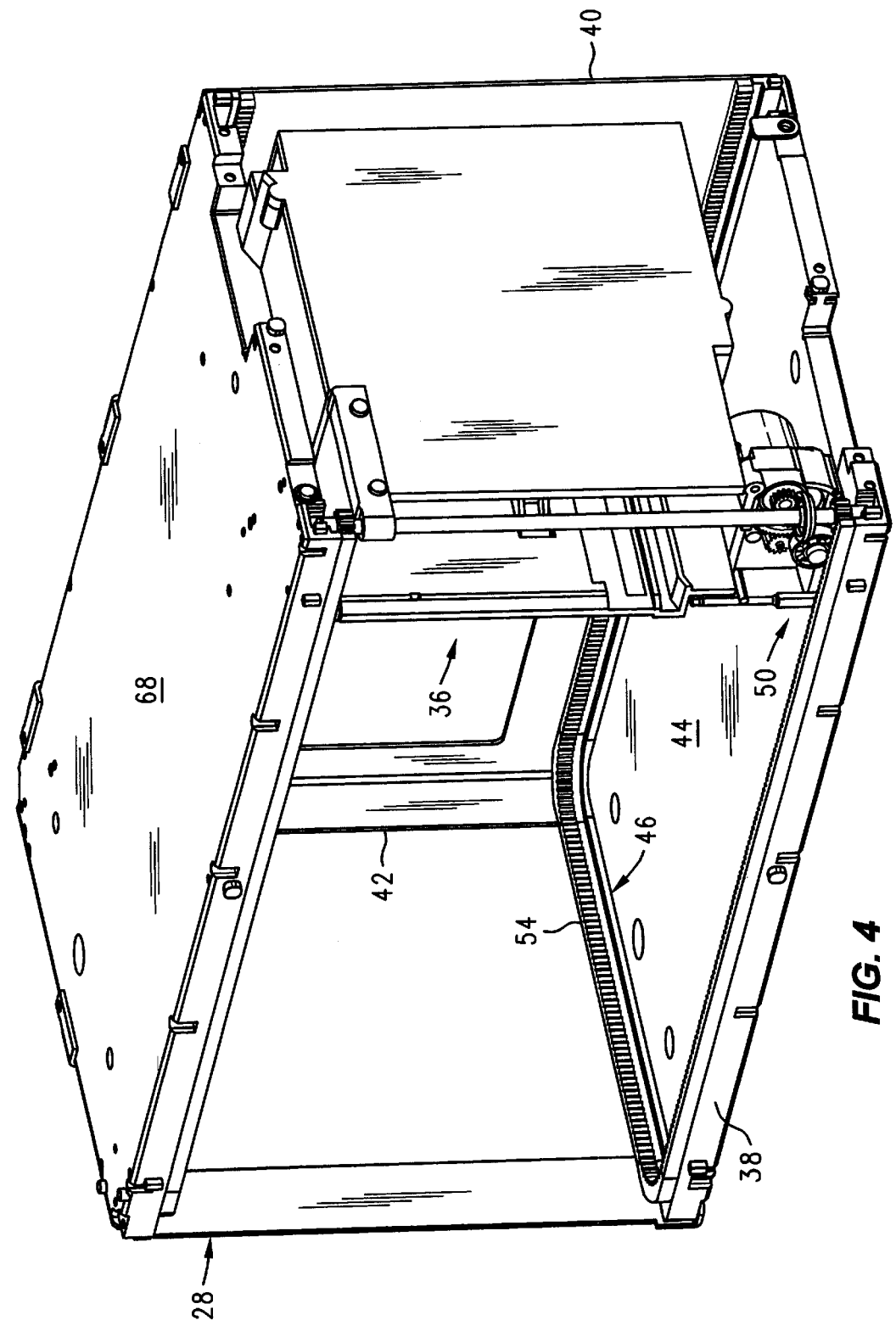
FIG. 4 is a perspective view of the cartridge handling system shown in FIG. 2.

Referring now to FIGS. 2 and 4, the cartridge handling system 28 disclosed in U.S. Pat. No. 6,025,972 referred to above and that may be used in one preferred embodiment of the present invention may comprise a generally rectangularly shaped structure having a pair of opposed side portions 38, 40 and an end portion 42. A "fixed" cartridge storage array 57 may be positioned adjacent the first side portion 38 of the cartridge handling system 18. The fixed cartridge storage array 57 may comprise any of a wide range of devices suitable for receiving one or more data cartridges 14. By way of example, in one preferred embodiment, the fixed cartridge storage array 57 may comprise a pair of cartridge magazines 20, each of which is configured to hold a plurality of data cartridges 14. In an alternative embodiment, the fixed cartridge storage array 57 may be replaced by a separate data cartridge exchange drawer 16', as best seen in FIG. 3. As explained above, such an alternative configuration would allow the cartridges 14 positioned adjacent the first side portion 38 to be accessed in essentially the same manner as those contained in drawer 16 adjacent the opposed side portion 40.

The drawer 16 comprising the data cartridge exchange apparatus 10 may be mounted adjacent the second side portion 40 of the cartridge handling system 28. The drawer 16 may be configured to receive at least one data cartridge 14. By way of example, in one preferred embodiment, the drawer 16 is configured to receive a pair of cartridge magazines 20, each of which may be configured to hold a plurality of data cartridges 14. The drawer 16 and the data cartridges 14 stored therein together define a "moveable" cartridge storage array 59. A pair of cartridge read/write devices 32 may be positioned adjacent the end portion 42 of the cartridge handling system 28 in the manner best seen in FIG. 2.

With reference to FIGS. 2 and 4, the cartridge handling system 28 utilized in one preferred embodiment may comprise a lower plate 44 having U-shaped guide member or channel 46 therein which guides a cartridge engaging device or "picker" 36 along a generally U-shaped path 48 so that the cartridge engaging device or picker 36 may access the data cartridges 14 contained in the various cartridge storage magazines 20 and the cartridge read/write devices 32. The cartridge engaging device 36 may be moved along the U-shaped guide member or channel 46 by an actuator system 50. For example, the actuator system 50 may move the cartridge engaging device 36 between a first position 52 adjacent the fixed cartridge storage array 57, a second position 52' adjacent the cartridge read/write devices 32, and a third position 52" adjacent the moveable cartridge storage array 59, i.e., along the generally U-shaped path 48.

Figure 5:
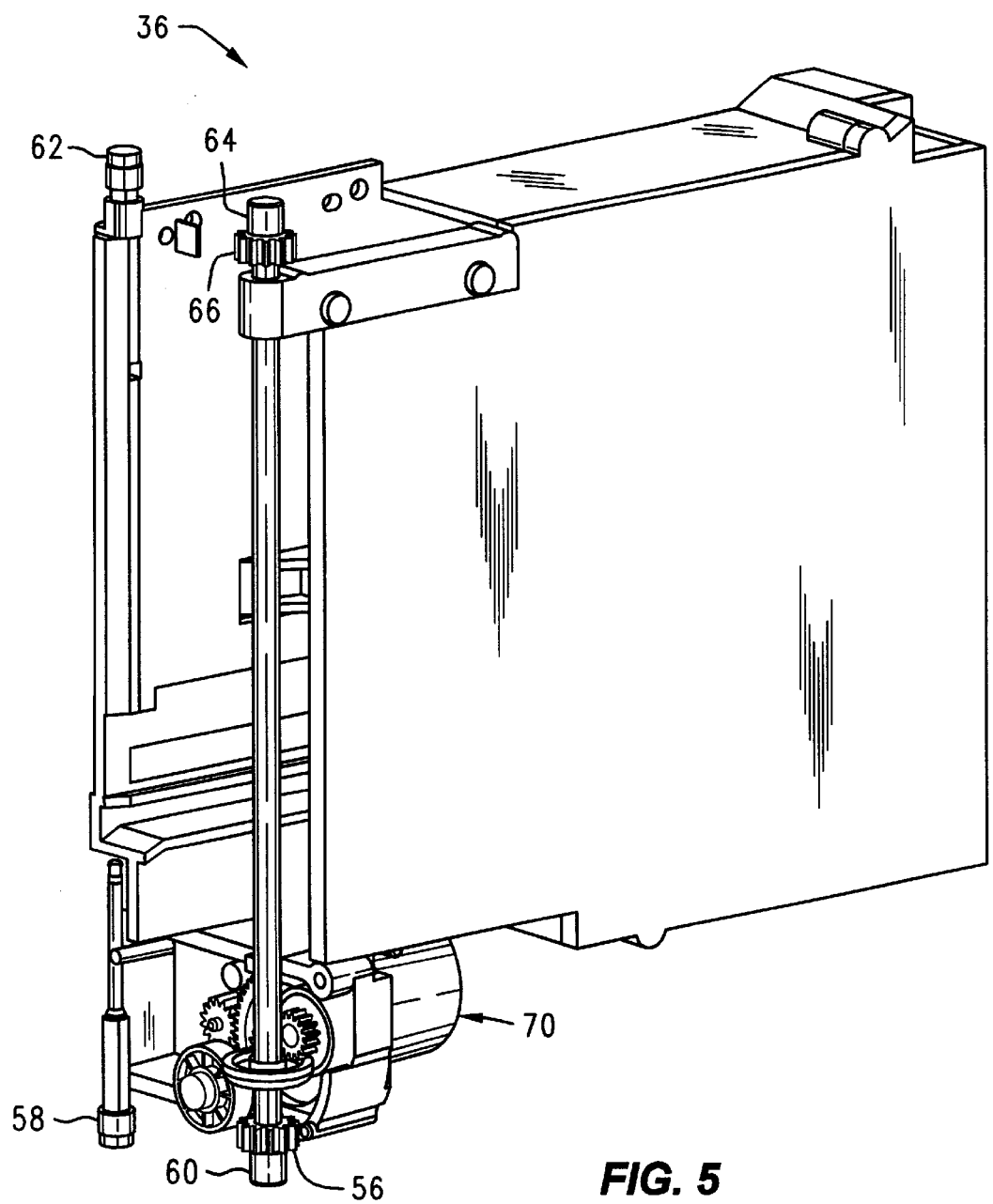
FIG. 5 is a perspective view of a cartridge engaging assembly that may be used in the cartridge handling system shown in FIG. 4.

The cartridge engaging device or "picker" 36 is best seen in FIG. 5 and may comprise apparatus suitable for loading and retrieving the data cartridges 14 to and from the particular cartridge receiving device (e.g., the cartridge magazine 20 or cartridge read/write device 32) in which the data cartridge 14 is held. An example of a cartridge engaging device or "picker" 36 suitable for use in the present invention is shown and described in U.S. patent application Ser. No. 09/045,558, entitled "Cartridge Engaging Assembly with Rack Drive Thumb Actuator System," filed on Mar. 20, 1998, which is incorporated herein by reference for all that it discloses. Alternatively, other cartridge engaging assemblies suitable for use in the present invention are disclosed in the following U.S. patents which are specifically incorporated by reference herein for all that they disclose: U.S. Pat. No. 4,998,232 entitled "Optical Disk Handling Apparatus with Flip Latch;" U.S. Pat. No. 5,010,536 entitled "Cartridge Handling System;" U.S. Pat. No. 5,014,255 entitled "Optical Disk Cartridge Handling Apparatus with Passive Cartridge Engagement Assembly;" and U.S. Pat. No. 5,043,962 entitled "Cartridge Handling System." Since such cartridge engaging devices or "pickers" are well-known in the art and since the details of such devices are not necessary to understand or practice the present invention, the particular cartridge engaging device utilized in one preferred embodiment of the present invention will not be described in further detail herein.

Referring now to FIGS. 4 and 5, the actuator system 50 used to move the cartridge engaging assembly 36 may comprise a rack and pinion drive system having a U-shaped gear rack 54 mounted adjacent the U-shaped guide member or channel 46 in the lower plate 44. A lower pinion gear 56 may be mounted to the cartridge engaging assembly 36 so that it engages the U-shaped gear rack 54. A pair of lower bearing members 58, 60 mounted to the cartridge engaging assembly 36 are configured to be received by the U-shaped guide member or slot 46. The cartridge engaging assembly 36 may also be provided with a pair of upper bearing members 62, 64 and an upper pinion gear 66 which engage an upper U-shaped guide member (not shown) and an upper U-shaped gear rack (not shown) provided on an upper plate 68 associated with the cartridge handling system 28. A drive pinion actuator system 70 is used to drive the lower and upper pinion gears 56 and 66 and move the cartridge engaging assembly 36 along the U-shaped path 48.

The foregoing description of the data storage system 12 and cartridge handling system 28 is provided in order to better understand one environment in which may be used the data cartridge exchange apparatus 10 according to the present invention. However, it should be understood that the data cartridge exchange apparatus 10 may be used in any of a wide range of other types of data storage systems and in conjunction with any of a wide range of cartridge positioning systems now known in the art or that may be developed in the future. Consequently, the present invention should not be regarded as limited to the particular jukebox data storage system 12 and cartridge handling system 28 shown and described herein. Also, since detailed descriptions of the data storage system 12 and cartridge handling system 28 are not required to understand or practice the data cartridge exchange apparatus 10 according to the present invention, the particular jukebox data storage system 12 and cartridge handling system 28 that may be used in conjunction with the data cartridge exchange apparatus 10 will not be described in further detail herein.

The data cartridge exchange apparatus 10 according to one preferred embodiment of the present invention may comprise a drawer 16 configured to receive one or more data cartridges 14. See FIG. 1. The arrangement is such that the drawer 16 comprises the moveable cartridge storage array 59 (FIG. 2) which forms a part of the "regular" cartridge storage array of the data storage system 12 when the drawer 16 is in the fully retracted position. As used herein, the term "regular cartridge storage array" refers to both the fixed cartridge storage array 57 and the moveable cartridge storage array 59. Put in other words, the drawer 16 comprises a cartridge receiving device that is accessible to the cartridge handling system 36 so that the data cartridges 14 carried thereby may be accessed by the cartridge handling system 36 during the normal or regular course of operation of the data storage system 12.

The drawer 16 utilized in one preferred embodiment of the invention may be formed by a cartridge magazine tray 76 that may be mounted directly to the mounting system 22 in the manner that will be described in greater detail below. The magazine tray 76 may be configured to removably receive two (2) cartridge magazines 20 in the manner best seen in FIG. 6. Each cartridge magazine 20 in turn may be configured to receive five (5) data cartridges 14, although magazines 20 configured to hold a greater or lesser number of data cartridges 14 may also be used. In the embodiment shown and described herein the magazine tray 76 may comprise a generally rectangular member having a floor section 71, a back section 73, and opposed end walls 75 and 77 (end wall 77 is shown in FIG. 3). Magazine tray 76 may also be provided with a center divider section 79 located substantially between the end walls 75 and 77. Each end wall 75, 77 may be provided with a spring member 81 to urge the cartridge magazines 20 against the center divider section 79, although this is not required.

The magazine tray 76 may be made from any of a wide range of materials, such as metals or plastics, suitable for the intended application. By way of example, in one preferred embodiment, the magazine tray 76 is molded as a single piece from a fiber reinforced polycarbonate plastic material. The cartridge magazines 20 may also be made from any of a wide range of materials, depending on the requirements of the particular application. By way of example, the cartridge magazines 20 utilized in one preferred embodiment are also molded from a fiber reinforced polycarbonate plastic material.

Before proceeding with the description, it should be noted that in the embodiment shown and described herein, the cartridge magazines 20 carried by the magazine tray 76 forming drawer 16 are identical to the cartridge magazines 20 comprising the fixed cartridge storage array 57 (FIG. 2), although this is not necessary. Accordingly, the cartridge magazines 20 received by the drawer 16 comprise the cartridge receiving device that is accessible to the cartridge handling system 36 during the normal or regular course of operation of the data storage system 12. However, other arrangements are possible. For example, the drawer 16 could be configured to directly receive one or more data cartridges 14 (i.e., without the need for a separate cartridge magazine 20). In still another configuration, the drawer 16 could comprise a hybrid arrangement, with certain areas of the drawer 16 being configured to directly receive individual data cartridges 14 and with other areas of the drawer 16 being sized to receive a cartridge magazine or magazines (e.g., cartridge magazine 20). Consequently, the present invention should not be regarded as limited to the particular configuration of the cartridge magazine tray 76 shown and described herein.

Drawer 16 may also be provided with a front panel member or bezel 30 (FIG. 1) that also may be attached directly to the guide rail 78 in the manner that will be described below. Alternatively, the front panel member or bezel 30 may be attached to the magazine tray 76 or may even comprise an integral portion of the magazine tray 76. Front panel member or bezel 30 forms a part of the front panel or bezel 26 of the data storage system 12 when the drawer 16 is in the retracted position. Front panel member 30 also provides a convenient means to allow the system operator to pull-open the drawer 16.

The drawer 16 is mounted to the jukebox data storage system 12 by a drawer mounting system 22. Referring now to FIGS. 7–12, the drawer mounting system 22 may comprise three guide rails 72, 74, and 78 which are configured to be mounted in sliding engagement with one another so as to allow the drawer 16 to be moved between the extended (i.e., open) and retracted (i.e., closed) positions in the manner already described. Each of the three guide rails 72, 74, and 78 may comprise one of two configurations: A first configuration (illustrated in FIGS. 8 and 10) and a second configuration (illustrated in FIGS. 9 and 11). More specifically, guide rails 72 and 78 may comprise the first configuration, whereas guide rail 74 may comprise the second configuration. Accordingly, only two guide rail configurations are required, even though the mounting system 22 utilizes three separate guide rails 72, 74, and 78.

The guide rails 72 and 78 having the first configuration are best seen in FIGS. 8 and 10 and may be identical to one another in all respects. Each guide rail 72 and 78 may comprise an elongate member having a back portion 80 from which extend a pair of flanges 82 and 86. A first bearing track 88 extends generally outwardly from the flange 82 and, together with flange 82 and back portion 80, defines a first channel 92. Similarly, a second bearing track 90 extends generally outwardly from the flange 86 and, together with flange 86 and back portion 80, defines a second channel 94. The two bearing tracks 88 and 90 are substantially parallel to the back member 80, as best seen in FIG. 10. A pair of U-shaped bearing members 96 may be provided within the channels 92 and 94 at substantially the proximal end 61 of each guide 72, 78. See FIG. 8.

The guide rail having the second configuration (e.g., guide rail 74) is best seen in FIGS. 9 and 11 and may comprise a cross-section generally in the form of a Roman numeral II. That is, the guide rail 74 having the second configuration may comprise a pair of elongate bearing guide members 11 and 13 held in substantially parallel-spaced apart relation by a pair of flange members 15 and 17. The portions of the first bearing guide member 11 that are outboard of the flanges 15 and 17 form bearing tracks 63 and 65. Similarly, the portions of the second bearing guide member 13 that are outboard of the flanges 15 and 17 form bearing tracks 67 and 69. The guide members 11 and 13, together with first and second flanges 15 and 17, define respective first and second channels 19 and 21.

The bearing guide members 11 and 13 of guide rail 74 having the second configuration also may be provided with a plurality of U-shaped bearing members 96 located substantially in the positions shown in FIG. 9. More specifically, a total of four bearings 96 may be affixed to the lower bearing tracks 67 and 69: Two bearings 96 at about the proximal end 85 of guide rail 74, and two bearings 96 at about the center region 89 of guide rail 74. Similarly, a total of four bearings 96 may be affixed to the upper bearing tracks 63 and 65: Two bearings 96 at about the center region 89 and two bearings 96 at about the distal end 87 of guide rail 74.

The guide rails 72, 74, and 78 may be made from any of a wide range of materials (such as metals or plastics) suitable for the intended application. Consequently, the present invention should not be regarded as limited to guide rails being fabricated from any particular material. By way of example, in one preferred embodiment, the guide rails 72, 74, and 78 are formed from extruded aluminum. The bearing members 96 may also be made from a wide range of materials suitable for providing a low friction sliding engagement with the guide rails 72, 74, and 78. By way of example, in the embodiment shown and described herein, each bearing member 96 is molded as a single piece from polythalamide plastic. Alternatively, other types of bearings, such as wheels or rollers, could be substituted for the sliding bearings 96 shown and described herein.

The various guide rails 72, 74, and 78 may be slidably engaged with one another in the manner best seen in FIGS. 7 and 12. That is, the channels 92 and 94 of the guide rails (e.g., 72 and 78) having the first configuration receive the U-shaped bearing members 96 mounted to the bearing guide members 11 and 13 of the guide rail (e.g., 74) having the second configuration. Similarly, the U-shaped bearings 96 located in the channels 92 and 94 of the guide rails 72 and 78 having the first configuration engage the bearing guide members 11 and 13 of the guide rail 74 having the second configuration.

The locations of the U-shaped bearings 96 on the various guide rails are such that the U-shaped bearings 96 located in the channels 92 and 94 of the guide rails 72 and 78 will come into abutting contact with the U-shaped bearings 96 affixed to the bearing guide members 11 and 13 of guide rail 74 when the rails 72, 74, and 78 are in the fully extended position illustrated in FIG. 7. More specifically, the bearings 96 located on the lower guide rail 72 will come into abutting contact with the bearings 96 on the lower bearing tracks 67 and 69 that are located in the center region 89 of guide rail 74. Similarly, the bearings 96 located on the upper guide rail 78 will come into abutting contact with the bearings 96 on the upper bearing tracks 63 and 65 that are located in the center region 89 of guide rail 74. The foregoing bearing arrangement prevents the system operator from inadvertently pulling the drawer 16 beyond the extended position and thereafter possibly pulling apart or separating the various guide rails 72, 74, and 78.

Referring now to FIG. 7, the guide rails 72 and 78 having the first configuration may be provided with one or more mounting holes or slots 83 to allow the guide rails to be mounted to the chassis 29 of jukebox data storage system 12 and to allow the magazine tray 76 to be mounted to the guide rail. For example, in one preferred embodiment, guide rail 72 is mounted directly to the chassis 29 (FIG. 3) of jukebox 12 by a plurality of screws (not shown). Similarly, the magazine tray 76 may be mounted directly to the guide rail 78 also by a plurality of screws (not shown). Alternatively, other types of fasteners now known in the art or that may be developed in the future may be used to mount rail 72 to the chassis 29 and the magazine tray 76 to rail 78.

The data cartridge exchange apparatus 10 may also be provided with a cartridge magazine alignment apparatus 23 to provide more positive positioning of the magazines 20 when the drawer 16 is in the fully retracted position. Referring now to FIGS. 6 and 13, the cartridge magazine alignment apparatus 23 may comprise a pair of elongate reference rails 25 and 27 which are mounted in spaced-apart relation to the chassis 29 of the jukebox data storage system 12 in the manner best seen in FIG. 3. Each cartridge magazine 20 is provided with first and second elongate slots 31 and 33 therein which are sized to slidably engage the respective elongate reference rails 25 and 27 when the drawer 16 is moved to the retracted position. The engagement of the elongate reference rails 25 and 27 with the respective slots 31 and 33 in the magazines 20 slightly lifts the magazines 20 from the drawer 16 and holds each magazine 20 in a registration position 35, as best seen in FIG. 13. Consequently, when the drawer 16 is fully retracted, the positions of the magazines 20 are determined by the cartridge magazine alignment apparatus 23 and not by the drawer 16.

The cartridge magazine alignment apparatus 23 more accurately positions the cartridge magazines 20 than would be normally possible if the cartridge magazines 20 were to remain seated in the magazine tray 76 of drawer 16. The more accurate positioning provided by the cartridge magazine alignment apparatus 23 substantially improves the likelihood that the cartridge picker 36 will be capable of engaging the selected data cartridge 14 without mis-feeds. The arrangement also dispenses with the need to provide a high precision drawer mounting system. That is, since the magazines 20 are not held in position by the drawer 16, the drawer 16 need not be designed to return the magazines 20 to their exact locations each time the drawer 16 is closed.

Figure 14:
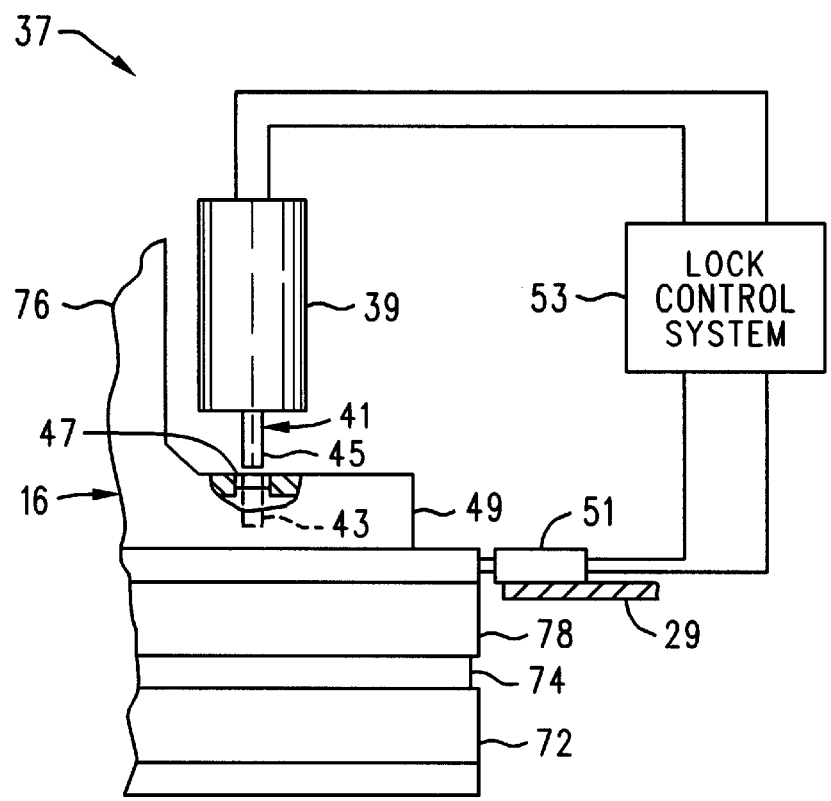
FIG. 14 is a side view in elevation of the drawer lock apparatus for locking the drawer in the retracted position.
Figure 15:
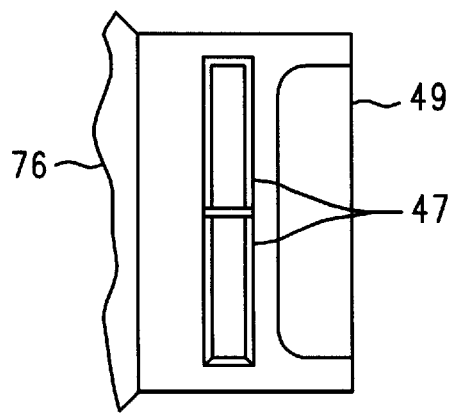
FIG. 15 is a plan view of the lock plate.

As mentioned above, it is generally preferred, but not required, that the data cartridge exchange apparatus 10 also be provided with a drawer lock apparatus 37 to hold the drawer 16 in the fully retracted position. Referring now to FIGS. 14 and 15, the drawer lock apparatus 37 utilized in one preferred embodiment may comprise a lock actuator 39 for moving a lock bolt or plunger 41 between a locked position 43 and an unlocked position 45. A spring (not shown) may be used to bias the lock bolt 41 in the unlocked position 45. The lock bolt 41 is sized to engage at least one of the apertures 47 provided in a lock plate 49 affixed to the drawer 16. A limit switch 51 may be mounted to the chassis 29 of jukebox data storage system 12 and may provide a signal to the lock control system 53 when the drawer 16 is in the fully closed or retracted position.

In the embodiment shown and described herein, the lock plate 49 comprises an integral portion of magazine tray 76. However, since the magazine tray 76 is designed to be utilized in either a right-hand drawer (e.g., drawer 16) or a left-hand drawer (e.g., drawer 16', FIG. 3), the magazine tray 76 is provided with two lock plates 49, 49', one located at either end of the magazine tray 76. See FIG. 3. This arrangement allows a single magazine tray 76 to be used in either a right-hand or a left-hand drawer by simply turning the magazine tray 76 one-hundred-eighty degrees (180°). Also, in the embodiment shown and described herein, the lock actuator 39 is not located along the centerline of the guide rail 78, but is instead displaced slightly to one side. Accordingly, the lock plate 49 is provided with two apertures 47, which again allows the same magazine tray 76/lock plate assembly 49 to be used in either a right-hand or left-hand configuration.

The various components of the drawer lock apparatus 37 may comprise any of a wide range of devices and systems well-known in the art and that are readily commercially available. For example, the lock actuator 39 may comprise an electrically operated solenoid having a plunger 41 sized to engage at least one of the holes 47 provided in lock plate 49. In the embodiment shown and described herein, the lock actuator 39 is biased in the unlocked position 45 by a suitable spring (not shown). Consequently, with the solenoid is energized, it will move the lock bolt 41 to the locked position 43. Of course, other types of components and operating arrangements could also be used, as would be obvious to persons having ordinary skill in the art.

The data cartridge exchange apparatus 10 may be operated as follows to allow the system operator (not shown) to access the various data cartridges 14 contained within the data storage system 12. Consider, for example, a situation wherein the data storage system 12 has been provided with a plurality of data cartridges 14. During normal operation, the drawer 16 may remain in the closed or retracted position shown in FIG. 2, thereby allowing the cartridge handling system 28 (FIGS. 2 and 4) internal to the data storage system 12 to access all of the data cartridges 14 contained therein. If the need arises for the system operator to access one or more of the data cartridges 14, such as, for example, to remove one or more of the data cartridges 14 and replace it or them with a substitute data cartridge or data cartridges (not shown), the system operator may pull on the front panel 30 of the drawer 16, thereby moving the drawer 16 to the extended position (FIG. 1). If the data cartridge exchange apparatus 10 is provided with a drawer lock apparatus 37, the lock control system 53 first would need to actuate the lock actuator 39 to move the lock bolt or plunger 41 to the unlocked position 45, thereby unlocking drawer 16. The lock control system 53 could be so instructed by the jukebox control system (not shown), or by the system operator via control panel 24, as would be obvious to persons having ordinary skill in the art after having become familiar with the teachings of the present invention.

Once the drawer 16 has been opened or extended, the system operator may thereafter access the exposed data cartridges 14 for the exchange, removal, or replacement of the same. While the drawer 16 is in the extended position, the data storage system 12 may remain operable and the cartridge handling system 28 may continue to access the data storage cartridges 14 stored in the fixed cartridge storage array 57 (i.e., those cartridges 14 not contained in drawer 16).

When the system operator no longer needs access to the exposed data cartridges 14, he or she may push on the front panel 30 of drawer 16, thereby returning the drawer 16 to the retracted position. As the drawer 16 is moved to the retracted position, the elongate reference rails 25 and 27 engage the respective slots 31 and 33 on the cartridge magazines 20. When fully engaged with the slots 31 and 33, the reference rails 25 and 27 slightly lift the magazines 20 from the drawer 16 and hold each magazine 20 in the registration position 35 shown in FIG. 13.

After the drawer 16 has been returned to the retracted position, the data storage system 12 or system operator may command the lock control system 53 to operate the drawer lock apparatus 37 to lock the drawer 16 in the closed or retracted position. Thereafter, the data storage system 12 may "re-inventory" the data cartridges 14 contained within the data storage system 12. In the present example, the data storage system 12 need only re-inventory the data cartridges 14 contained in the drawer 16 since those were the only data cartridges 14 that could have been exchanged, removed, or replaced by the system operator.

If the data cartridge exchange apparatus 10 is configured so that the various data cartridges 14 carried by the drawer 16 are contained within one or more cartridge magazines 20, the data cartridge exchange apparatus 10 will allow an entire cartridge magazine 20 to be removed and replaced. For example, in the embodiment shown and described herein, the drawer 16 is configured to receive two cartridge magazines 20, each of which is configured to receive five (5) data cartridges 14. In this example, then, the entire cartridge magazine 20 may be removed by the system operator, thereby allowing for the convenient exchange, removal, or replacement of the plurality of data cartridges 14 contained within the cartridge magazine 20. The cartridge magazine 20 may be provided with a handle 34 to allow the cartridge magazine 20 to be conveniently carried by the system operator.

It should be noted that any of the data cartridges 14 contained within the data storage system 12 may be accessed via the data cartridge exchange apparatus 10. For example, data cartridges 14 stored in the magazines 20 that are mounted in the fixed cartridge storage array 57 (FIG. 2) located opposite the drawer 16 may also be accessed by instructing the cartridge handling system 28 to move the selected data cartridges 14 from the fixed cartridge storage array 57 (i.e., those cartridge magazines 20 that are not mounted on the drawer 16) to the moveable cartridge storage array 59 (i.e., those cartridge magazines 20 that are contained in the drawer 16). After the selected data cartridges 14 have been transferred from the fixed cartridge storage array 57 to the moveable cartridge storage array 59, the system operator may then access the recently transferred data cartridges 14 in the manner already described by simply pulling open the drawer 16. Alternatively, if the jukebox data storage system 12 is provided with a second drawer 16' as shown in FIG. 3, the operator may directly access those cartridges by simply opening the second drawer 16' in the same manner as the first drawer 16.

It is contemplated that the inventive concepts herein described may be variously otherwise embodied and it is intended that the appended claims be construed to include alternative embodiments of the invention except insofar as limited by the prior art.

What is claimed is:

1. A data cartridge exchange apparatus for a data storage system, comprising:
    a drawer sized to receive a data cartridge;
    a first guide rail having a first configuration mounted to said drawer;
    a guide rail having a second configuration, said guide rail having the second configuration being sized to engage said first guide rail having the first configuration;
    a second guide rail having the first configuration mounted to the data storage system, said second guide rail having the first configuration being sized to engage said guide rail having the second configuration so that said drawer can be moved between a retracted position and an extended position;
    a cartridge magazine sized to be received by said drawer, said cartridge magazine being sized to receive the data cartridge; and
    a cartridge magazine alignment apparatus mounted to the data storage system, said cartridge magazine alignment apparatus engaging said cartridge magazine when said drawer is in the retracted position and holding said cartridge magazine in a registration position.

2. The data cartridge exchange apparatus of claim 1, wherein said cartridge magazine alignment apparatus comprises a first elongate reference rail and a second elongate reference rail mounted in spaced-apart relation on the data storage system and wherein said cartridge magazine includes a first elongate slot sized to receive said first elongate reference rail and a second elongate slot sized to receive said second elongate reference rail.

3. The data cartridge exchange apparatus of claim 2, wherein said drawer includes a magazine tray sized to receive said cartridge magazine.

4. The data cartridge exchange apparatus of claim 3, further comprising a drawer lock assembly mounted to said data storage system, said drawer lock assembly releasably engaging said drawer when said drawer is in the retracted position.

5. The data cartridge exchange apparatus of claim 4, wherein said drawer lock assembly comprises:
    a lock actuator mounted to said data cartridge exchange apparatus;
    a lock bolt operatively associated with said lock actuator, said lock actuator moving said lock bolt between a locked position and an unlocked position; and
    a lock plate mounted to said drawer, said lock plate having an aperture therein sized to receive said lock bolt.

6. The data cartridge exchange apparatus of claim 5, wherein said magazine tray is sized to receive two cartridge magazines.

7. The data cartridge exchange apparatus of claim 6, wherein said cartridge magazine is sized to receive five data cartridges.

8. The data cartridge exchange apparatus of claim 1, wherein said first and second guide rails having the first configuration each comprise:
    a back side;
    a first flange member extending generally outwardly from said back side;
    a second flange member extending generally outwardly from said back side, said second flange member being located in spaced-apart, parallel relation from said first flange;

a first bearing track extending generally outwardly from said first flange member; and a second bearing track extending generally outwardly from said second flange member.

9. The data cartridge exchange apparatus of claim 8, wherein said guide rail having the second configuration comprises:

a first flange member having a first end and a second end;

a first bearing guide member extending generally outwardly from the first end of said first flange member, said first bearing guide member having a first bearing track and a second bearing track; and a second bearing guide member extending generally outwardly from the second end of said first flange member, said second bearing guide member having a first bearing track and a second bearing track.

10. The data cartridge exchange apparatus of claim 9, further comprising first and second bearings positioned at one end of each of said first and second guide rails having the first configuration, said first and second bearings being sized to engage the first and second bearing tracks of said guide rail having the second configuration.

11. The data cartridge exchange apparatus of claim 10, further comprising first and second bearings positioned at a first end of said guide rail having the second configuration, and third and fourth bearings positioned between first and second ends of said guide rail having the second configuration, said first, second, third, and fourth bearings being sized to engage the first and second bearing tracks of said first and second guide rails having the first configuration.

12. The data cartridge exchange apparatus of claim 11, wherein a first channel is defined between said first bearing track, said first flange member, and said base of each of said first and second guide rails having the first configuration and wherein a second channel is defined between said second bearing track, said second flange member, and said base of each of said first and second guide rails having the first configuration.

13. The data cartridge exchange apparatus of claim 12, wherein said guide rail having the second configuration further comprises a second flange member extending between said first and second bearing guide members and wherein a first channel is defined between the first and second bearing guide members and said first flange and wherein a second channel is defined between the first and second bearing guide members and said second flange.

14. The data cartridge exchange apparatus of claim 13, wherein said first bearing of each of said first and second guide rails having the first configuration is positioned in the first channel and wherein said second bearing of each of said first and second guide rails having the first configuration is positioned in the second channel.

15. The data cartridge exchange apparatus of claim 13, wherein said first and third bearings of said guide rail having the second configuration are positioned in the first channel and wherein said second and fourth bearings of said guide rail having the second configuration are positioned in the second channel.

16. A data cartridge exchange apparatus for a data storage system, comprising:

a drawer sized to receive a data cartridge;

first guide rail means having a first configuration mounted to said drawer;

guide rail means having a second configuration for engaging said first guide rail means having the first configuration;

a second guide rail means having the first configuration mounted to the data storage system for engaging said guide rail means having the second configuration so that said drawer can be moved between a retracted position and an extended position;

cartridge magazine means for receiving the data cartridge, said cartridge magazine means being sized to be removably received by said drawer; and cartridge magazine alignment means mounted to the data storage system for engaging said cartridge magazine means when said drawer is in the retracted position and for holding said cartridge magazine means in a registration position.

17. The data cartridge exchange apparatus of claim 16, further comprising drawer lock means operatively associated with said drawer for locking said drawer in the retracted position.

* * * * *